US011443561B2

(12) United States Patent
Park et al.

(10) Patent No.: US 11,443,561 B2
(45) Date of Patent: Sep. 13, 2022

(54) VEHICLE DEVICE, SYSTEM AND METHOD FOR PAYMENT PROCESSING USING VEHICLE DEVICE

(71) Applicants: HYUNDAI MOTOR COMPANY, Seoul (KR); KIA MOTORS CORPORATION, Seoul (KR)

(72) Inventors: Yun Joong Park, Seoul (KR); Jong Pil Park, Seoul (KR); Kyowoong Choo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 572 days.

(21) Appl. No.: 16/430,962

(22) Filed: Jun. 4, 2019

(65) Prior Publication Data

US 2020/0126318 A1    Apr. 23, 2020

(30) Foreign Application Priority Data

Oct. 23, 2018    (KR) .......................... 10-2018-0126935

(51) Int. Cl.
*G07B 15/02* (2011.01)
*G06Q 20/18* (2012.01)
*G06F 3/04817* (2022.01)
*H04L 12/66* (2006.01)
*H04L 67/10* (2022.01)

(52) U.S. Cl.
CPC ............. *G07B 15/02* (2013.01); *G06Q 20/18* (2013.01); *G06F 3/04817* (2013.01); *H04L 12/66* (2013.01); *H04L 67/10* (2013.01)

(58) Field of Classification Search
CPC .... G07B 15/02; G06Q 20/18; G06F 3/04817; H04L 12/66; H04L 67/10
See application file for complete search history.

(56) References Cited

U.S. PATENT DOCUMENTS

| 9,552,578 B2 | 1/2017 | Ghosh | |
| 2005/0065779 A1* | 3/2005 | Odinak | .................. G10L 15/30 |
| | | | 704/E15.047 |
| 2008/0147410 A1* | 6/2008 | Odinak | .................. G10L 15/26 |
| | | | 704/270.1 |

(Continued)

FOREIGN PATENT DOCUMENTS

| CN | 101339694 A | * | 1/2009 |
| CN | 102622871 A | * | 8/2012 |

(Continued)

OTHER PUBLICATIONS

Office Action issued in corresponding Chinese Patent Application No. 2019105449359 dated May 7, 2022, with English translation.

*Primary Examiner* — Shean Tokuta
(74) *Attorney, Agent, or Firm* — Morgan, Lewis & Bockius LLP

(57) ABSTRACT

A vehicle device includes: a communication device configured to transmit or receive a signal to or from a cloud server operating in conjunction with a service device of a parking lot upon entering the parking lot; and a controller configured to output parking lot information received from the cloud server upon entering the parking lot, and to identify charge settlement information of the parking lot from the cloud server to pay a settlement charge, when a predetermined charge settlement event occurs.

21 Claims, 15 Drawing Sheets

(56) References Cited

U.S. PATENT DOCUMENTS

| | | | |
|---|---|---|---|
| 2012/0203557 A1* | 8/2012 | Odinak | G01C 21/3608 |
| | | | 704/270.1 |
| 2014/0122190 A1* | 5/2014 | Wolfson | G08G 1/141 |
| | | | 705/13 |
| 2015/0130638 A1* | 5/2015 | Bahgat | G08G 1/0175 |
| | | | 340/932.2 |
| 2016/0247143 A1 | 8/2016 | Ghosh | |
| 2016/0247210 A1* | 8/2016 | Yamashiro | G07B 15/02 |
| 2016/0321715 A1* | 11/2016 | Xu | G07B 15/06 |
| 2018/0122152 A1 | 5/2018 | Shin | |
| 2018/0122153 A1* | 5/2018 | Shin | G08G 1/04 |
| 2018/0253715 A1* | 9/2018 | Loeffler | G07F 17/246 |
| 2019/0057376 A1* | 2/2019 | Perez-Tamayo | G06Q 20/127 |
| 2020/0126318 A1* | 4/2020 | Park | G06Q 20/127 |

FOREIGN PATENT DOCUMENTS

| | | | | | |
|---|---|---|---|---|---|
| CN | 103345777 | A | | 10/2013 | |
| CN | 105844951 | A | * | 8/2016 | |
| CN | 106023597 | A | | 10/2016 | |
| CN | 106504349 | A | | 3/2017 | |
| CN | 107330983 | A | | 11/2017 | |
| CN | 107430814 | A | | 12/2017 | |
| CN | 107845147 | A | | 3/2018 | |
| CN | 108154703 | A | * | 6/2018 | ............ G08G 1/144 |
| CN | 108198258 | A | | 6/2018 | |
| CN | 108230746 | A | | 6/2018 | |
| CN | 108389274 | A | * | 8/2018 | ........... G06Q 20/102 |
| CN | 108399783 | A | * | 8/2018 | |
| CN | 108665567 | A | * | 10/2018 | |
| JP | 2005115813 | A | * | 4/2005 | |
| JP | 2018010340 | A | * | 1/2018 | |
| JP | 2018106414 | A | * | 7/2018 | |
| KR | 10-1117004 | B1 | | 3/2012 | |
| WO | WO-2016159485 | A1 | * | 10/2016 | ......... G06K 9/00771 |
| WO | WO-2017005061 | A | * | 1/2017 | |
| WO | WO-2017202200 | A1 | * | 11/2017 | ............ G07B 15/06 |
| WO | WO-2018028011 | A1 | * | 2/2018 | ............ G07F 19/00 |
| WO | WO-2018088704 | A1 | * | 5/2018 | ........... B60R 25/042 |
| WO | 2018-182128 | A1 | | 10/2018 | |
| WO | WO-2018182128 | A1 | * | 10/2018 | ............ G06Q 20/14 |
| WO | WO-2019127149 | A1 | * | 7/2019 | ............ G06Q 20/14 |
| WO | WO-2020022679 | A1 | * | 1/2020 | ............. B60L 53/60 |

* cited by examiner

VEHICLE DEVICE, SYSTEM AND METHOD FOR PAYMENT PROCESSING USING VEHICLE DEVICE

CROSS-REFERENCE TO RELATED APPLICATION

This application claims the benefit of priority to Korean Patent Application No. 10-2018-0126935, filed in the Korean Intellectual Property Office on Oct. 23, 2018, the entire contents of which are incorporated herein by reference.

TECHNICAL FIELD

The present disclosure relates to a vehicle device, a payment processing system using the vehicle device, and a method using the vehicle device.

BACKGROUND

A conventional electronic payment system in a vehicle includes a vehicle device and a separate device for payment processing, and the vehicle device has proceeded to make a payment by connecting to the separate device using a beacon method or a phone connectivity method.

For example, a beacon is installed at each gas station to recognize the vehicle for making an electronic payment through interworking between the vehicle device and a lubricator, when the vehicle enters a self-service station.

However, as a beacon device needs to be installed for each service device, the infrastructure development cost is significantly high for such an electronic payment of the vehicle device. Further, the maintenance thereof is complicated.

SUMMARY

The present disclosure has been made to solve the above-mentioned problems occurring in the prior art while advantages achieved by the prior art are maintained intact.

An aspect of the present disclosure provides a vehicle device, a payment processing system using the vehicle device, and a method using the vehicle device, capable of recognizing vehicle information in a server linked to a service device of the parking lot when a vehicle enters a parking lot to automatically provide a guide indicating parking lot information to a driver of the vehicle, and automatically identifying the outstanding records between the vehicle device and the server when an event that the vehicle is leaving the parking lot occurs to pay a parking fee, thereby easily and efficiently paying the parking fee.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle device includes a communication device transmitting or receiving a signal to or from a cloud server operating in conjunction with a service device of a parking lot upon entering the parking lot and a controller.

The controller is configured to output parking lot information received from the cloud server upon entering the parking lot and to identify charge settlement information of the parking lot from the cloud server to pay a settlement charge, when a predetermined charge settlement event occurs.

The parking lot information includes at least one or more of a parking lot name, parking time, basic rate information and additional rate information, or discount information.

The charge settlement event includes at least one or more of an event of switching a state of an accelerator or start of a vehicle from an off state to an on state, an event of switching a door state from an open state to a closed state, and a sleep mode release event.

The controller is configured to identify locations of a vehicle and the parking lot from navigation to determine whether the vehicle enters the parking lot.

The controller is configured to transmit vehicle information for identifying the vehicle to the cloud server, when it is determined that the vehicle enters the parking lot.

The parking lot information further includes a payment flag for paying the settlement charge.

The charge settlement information includes outstanding charge information about a vehicle before entry of the parking lot.

The controller is configured to identify and pay an additional settlement charge, when charge settlement information about additional usage of the parking lot is received from the cloud server before leaving the parking lot.

According to another aspect of the present disclosure, a payment processing system using a vehicle device includes the vehicle device included in a vehicle and configured to pay a settlement charge of a parking lot, a service device of the parking lot, and a cloud server. The cloud server is configured to recognize information of the vehicle entering the parking lot, when a predetermined charge settlement event occurs from the vehicle, to guide charge settlement information of the parking lot generated from the service device, to the vehicle device, and to process the settlement charge, based on payment information received from the vehicle device.

The service device captures a license plate image of the vehicle entering the parking lot by using a camera to transmit the license plate image to the cloud server, and the cloud server is configured to recognize the information of the vehicle based on the license plate image of the vehicle received from the service device.

The cloud server is configured to recognize the information of the vehicle based on identification information of the vehicle received from the vehicle device, when the vehicle enters the parking lot.

The cloud server is configured to identify parking lot information from the service device to guide the parking lot information to the vehicle device, when it is determined that the vehicle is a vehicle capable of making an electronic payment, based on the information of the vehicle recognized when the vehicle enters the parking lot.

The cloud server is configured to update the parking lot information from the service device, when accessing the service device or when changing the parking lot information.

The charge settlement event includes at least one or more of an event of switching a state of an accelerator or start of a vehicle from an off state to an on state, an event of switching a door state from an open state to a closed state, and a sleep mode release event.

The cloud server is configured to include the outstanding charge information in the charge settlement information to guide the outstanding charge information to the vehicle device, when there is outstanding charge information before the vehicle enters the parking lot based on the information of the vehicle recognized when the vehicle enters the parking lot.

The cloud server is configured to recognize payment card information by comparing information registered in a customer database (DB) in advance with the recognized information of the vehicle and to process the settlement charge, based on the recognized payment card information.

The cloud server is configured to process a payment of the settlement charge of the vehicle, based on payment card information received from the vehicle device.

The cloud server is configured to provide payment completion information to the vehicle device, when a payment of the settlement charge is completed and it is determined that the vehicle is leaving the parking lot.

The cloud server is configured to identify charge settlement information about additional usage of the parking lot from the service device to guide the charge settlement information to the vehicle device, when the charge settlement event occurs in a state where a payment of the settlement charge of the vehicle is completed and the vehicle has not yet left the parking lot.

According to another aspect of the present disclosure, a payment processing method of a payment processing system including a vehicle device, a service device, and a cloud server includes: when a vehicle enters a parking lot, recognizing, by the cloud server, information of the vehicle; when a predetermined charge settlement event occurs from the vehicle, identifying, by the cloud server, charge settlement information of the parking lot from the service device linked through a gateway to guide the charge settlement information to the vehicle device; transmitting, by the vehicle device, payment information about a settlement charge to the cloud server based on the charge settlement information; and processing, by the cloud server, the settlement charge based on the payment information received from the vehicle device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
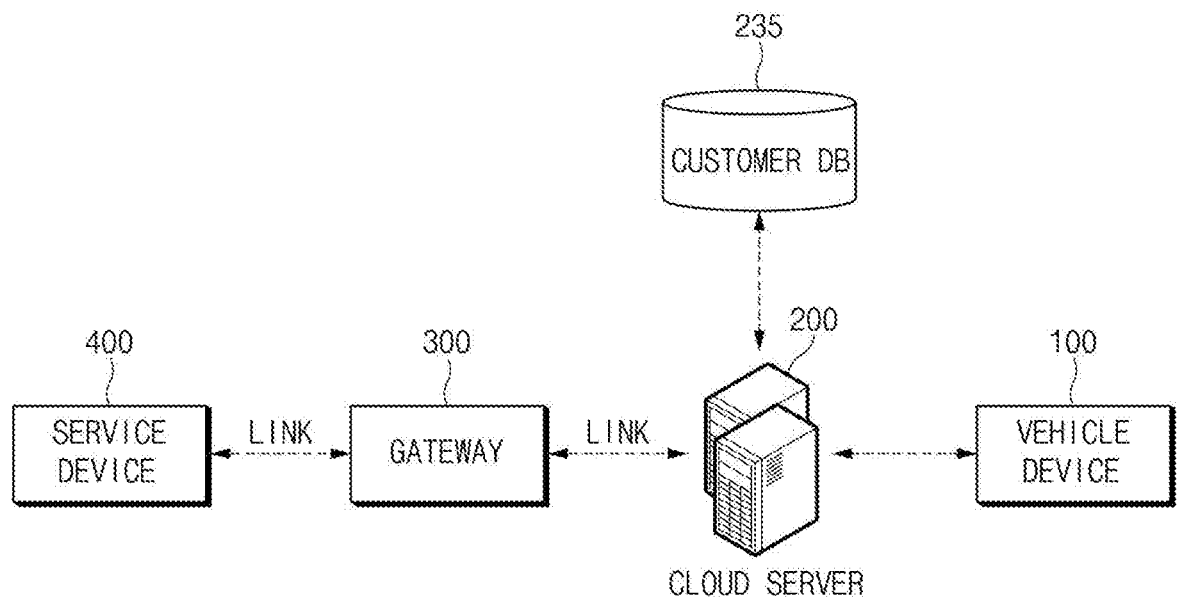
FIG. 1 is a view showing a payment processing system using a vehicle device, according to an exemplar)/embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a view showing a payment processing system using a vehicle device, according to an embodiment of the present disclosure.

A payment processing system (hereinafter, referred to as a "payment processing system") using a vehicle device according to an embodiment of the present disclosure may include a vehicle device 100, a cloud server 200, a gateway 300, and a service device 400.

The vehicle device 100 is a target terminal using a service. The vehicle device 100 includes a payment means for making an electronic payment of a service charge and makes a payment for a service charge using the payment means provided when using the service.

The description of the detailed configuration of the vehicle device 100 will be described in detail with reference to the embodiment of FIG. 3.

When a vehicle enters the service region of an associate company, the cloud server 200 recognizes the information of the entered vehicle and determines whether the corresponding vehicle is capable of making an electronic payment. At this time, the cloud server 200 provides a guide indicating the service utilization information to the vehicle device 100 when the corresponding vehicle is capable of making an electronic payment.

In addition, the cloud server 200 identifies the service charge of the vehicle at the request of the vehicle device 100, and then the cloud server 200 processes and approves the payment of the identified service charge.

The cloud server 200 may interwork with the service device 400 of the associate company providing the service to the vehicle device 100 through the gateway 300 so as to identify the service charge used by the vehicle device 100 and to provide a guide indicating the service charge to the vehicle device 100. For example, the associate company may be a parking lot, and the service device 400 may be a terminal installed at the entrance and exit of the parking lot. In the following embodiment, it is assumed that the service device 400 is a terminal installed in a parking lot. However, an embodiment is not limited thereto.

In addition, the cloud server 200 registers information registered in advance by a customer (user) using the vehicle device 100 in a customer database (DB) 235, and makes a payment requested by the vehicle device 100 by using customer information registered in the customer DB 235.

The description of the detailed configuration of the cloud server 200 will be described in detail with reference to the embodiment of FIG. 3.

Figure 2:
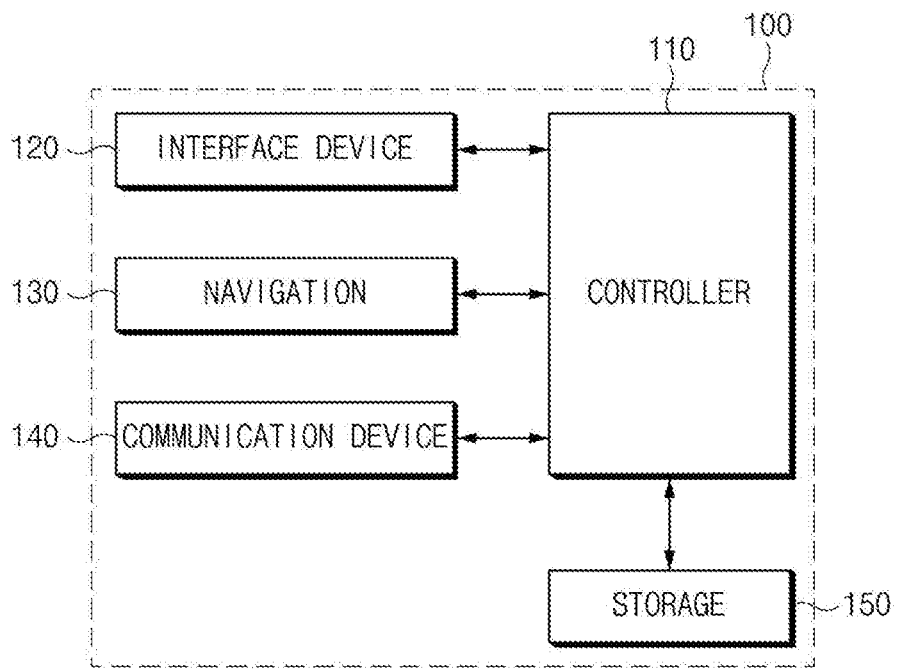
FIG. 2 is a block diagram illustrating a configuration of a vehicle device, according to an exemplary embodiment of the present disclosure.

FIG. 2 is a block diagram illustrating a configuration of a vehicle device, according to an embodiment of the present disclosure.

Referring to FIG. 2, the vehicle device 100 may include a controller 110, an interface device 120, navigation 130, a communication device 140, and storage 150. Here, the controller 110 of the vehicle device 100 according to an embodiment of the present disclosure may be implemented with at least one or more processors.

The controller 110 may process a signal transmitted between the respective components of the vehicle device 100.

The interface device 120 may include an input means for receiving a control command from a user and an output means for outputting the operation state and operation result of the vehicle device 100.

Herein, the input means may include a key button and may include a mouse, a joystick, a jog shuttle, a stylus pen, and the like. Furthermore, the input means may also include a soft key implemented on the display.

The output means may include a display and may include a voice output means such as a speaker. When a touch sensor such as a touch film, a touch sheet, or a touch pad is included in the display, the display may operate as a touch screen and may be implemented in the form in which the input means and the output means are integrated with each other.

The display may include at least one of a liquid crystal display (LCD), a thin film transistor-liquid crystal display (TFT-LCD), an organic light-emitting diode (OLED), a flexible display, a field emission display, or a 3D display.

The navigation 130 receives a GPS signal received from a plurality of satellites, searches for a location, and guides the detected location.

In addition, the navigation 130 may provide surrounding information registered in the map based on the current location. For example, the navigation 130 may provide location information of a parking lot based on the current location of the vehicle.

The controller 110 may determine whether a parking lot is entered, by comparing the current location of the vehicle provided from the navigation 130 with the location of the parking lot. The controller 110 may transmit vehicle information for identifying a vehicle to the cloud server 200 in conjunction with the service device 400 of the corresponding parking lot, when it is determined that the vehicle enters the parking lot. The information of the cloud server 200 may be received from the service device 400 of the parking lot that the vehicle has entered.

The communication device 140 may include a communication module that supports a communication interface with automotive components and/or control units included in the vehicle. For example, the communication module may communicate with the navigation 130 included in the vehicle and may receive location information of the host vehicle, parking lot information, and the like from the navigation 130.

Herein, the communication module may include a module that supports vehicle network communication such as Controller Area Network (CAN) communication, Local Interconnect Network (LIN) communication, Flex-Ray communication, or the like.

Moreover, the communication device 140 may include a communication module that supports a communication interface with the cloud server 200. For example, the communication module may include a module for wireless Internet access or a module for short range communication. Herein, the wireless Internet technology may include a wireless LAN (MILAN), a Wireless Broadband (Wibro), a Wi-Fi, a World Interoperability for Microwave Access (Wimax), and the like, and the short range communication technology may include Bluetooth, ZigBee, Ultra Wideband (UWB), Radio Frequency Identification (RFID), Infrared Communication Infrared Data Association (IrDA), and the like.

The storage 150 may store data and/or an algorithm required to operate the vehicle device 100.

The storage 150 may store information received from the navigation 130 via the communication device 140 and may store information received from the cloud server 200.

The storage 150 may store a command and/or algorithm for configuring a guide screen, a payment screen, and the like based on the information received from the navigation 130 and/or the cloud server 200, determining whether to make a payment, and making a payment based on the information input through the payment screen.

Herein, the storage 150 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The controller 110 may configure a parking lot information screen based on the parking lot information received from the cloud server 200 when entering a parking lot, and may display a guide screen through the display of the interface device.

Here, the parking lot information received from the cloud server 200 may include a parking lot name, parking time, basic rate information and additional rate information, discount information, and the like and may further include a payment flag.

In addition, the controller 110 may make a request for charge settlement information of the corresponding parking lot to the cloud server 200, when a charge settlement event occurs after entering the parking lot.

For example, the controller 110 may make a request for charge settlement information of the corresponding parking lot to the cloud server 200, when at least one or more charge settlement events of an event of switching the state of the accelerator or start of a vehicle from an off state to an on state, an event of switching a door state from an open state to a closed state, and a sleep mode release event occur.

At this time, the controller 110 may determine whether there is outstanding charge information before entering the parking lot, through the payment flag received from the cloud server 200 when a charge settlement event occurs. The controller 110 may pay an outstanding charge when there is outstanding charge information before entering the parking lot.

The controller 110 may transmit vehicle identification information, version information of a navigation device, and/or version information of a payment security module. Afterward, the controller 110 may receive update information of the navigation device and/or the payment security module from the cloud server 200. In this case, the controller 110 updates the navigation and/or the payment security module based on the update information received from the cloud server 200.

When information about a settlement charge is received from the cloud server 200, the controller 110 may configure a payment guide screen based on the received information and may display the payment guide screen through the display of the interface device 120.

Furthermore, the controller 110 transmits a payment proceeding request signal to the cloud server 200, when the payment proceeding request for the settlement charge is input from the user based on the information included in the payment guide screen.

When payment information is received from the cloud server 200, the controller 110 may configure a payment screen based on the received payment information and may display the payment screen through the display of the interface device 120.

Furthermore, the controller 110 may make a request for payment approval while transmitting the input information to the cloud server 200, when a payment method, payment authentication information, and the like are input through the payment screen. When approval completion information is received from the cloud server 200, the controller 110 may configure a payment completion screen based on the received approval completion information and may display the payment completion screen through the display of the interface device 120.

Figure 3:
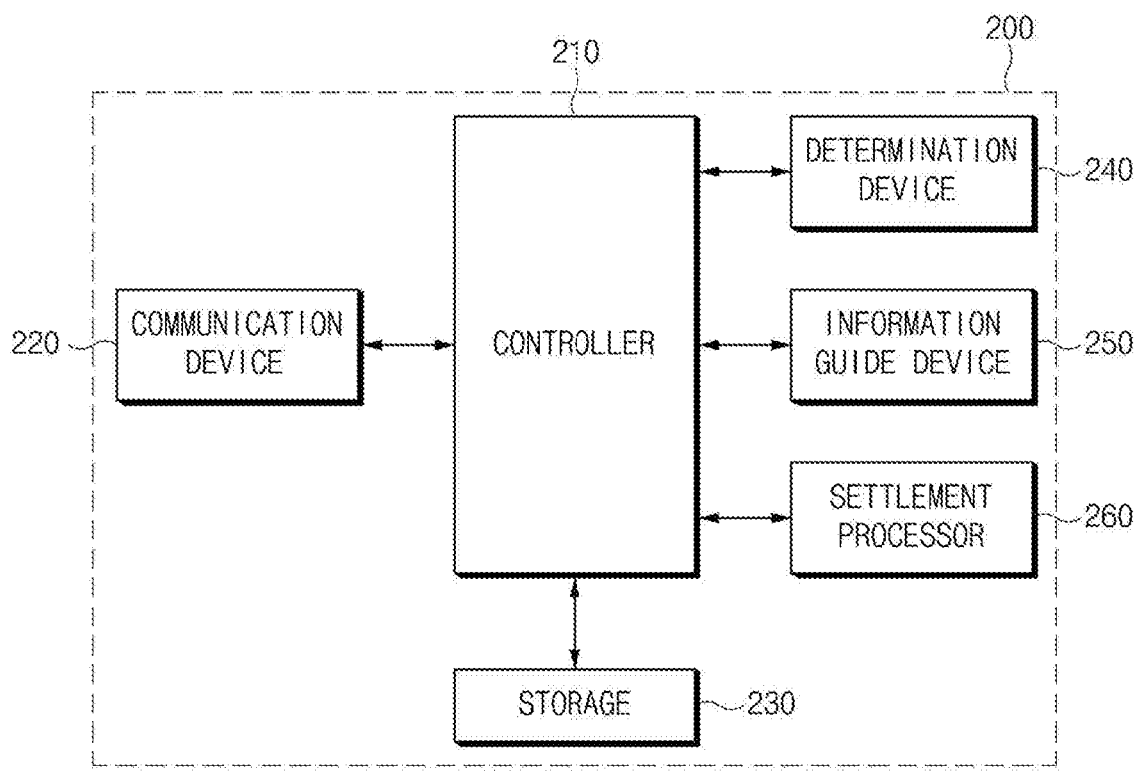
FIG. 3 is a block diagram illustrating a configuration of a cloud server, according to an exemplary embodiment of the present disclosure.

FIG. 3 is a block diagram illustrating a configuration of a cloud server, according to an embodiment of the present disclosure.

Referring to FIG. 3, the cloud server 200 may include a controller 210, a communication device 220, storage 230, a determination device 240, an information guide device 250, and a settlement processor 260. Here, the controller 210, the determination device 240, the information guide device 250, and the settlement processor 260 of the cloud server 200 according to an embodiment of the present disclosure may be implemented with at least one or more processors. In addition, the controller 210 may be an electronic control unit (ECU), and may be an embedded controller having the determination device 240, the information guide device 250, and the settlement processor 260 embedded therein.

The controller 210 may process a signal transmitted between the respective components of the cloud server 200.

The communication device 220 may include a communication module that supports a communication interface with the vehicle device 100. Furthermore, the communication device 220 may include a communication module that supports a communication interface with the service device 400. For example, the communication module may include a module for wireless Internet access or a module for short range communication. Herein, the wireless Internet technology may include a wireless LAN (WLAN), a Wireless Broadband (Wibro), a Wi-Fi, a World Interoperability for Microwave Access (Wimax), and the like, and the short range communication technology may include Bluetooth, ZigBee, Ultra Wideband (UWB), Radio Frequency Identification (RFID), Infrared Communication Infrared Data Association (IrDA), and the like.

The storage 230 may store data and/or an algorithm required to operate the cloud server 200.

The storage 230 may store information received from the vehicle device 100 and/or the service device 400 through the communication device 220. For example, the storage 230 may store vehicle information (e.g., VIN information, or the like), payment method information, authentication information, and the like, which are received from the vehicle device 100. The storage 230 may store the license plate image of the vehicle which is received from the service device 400, charge settlement information of a parking lot, the parking fee information and/or information about a state where the vehicle goes out.

Moreover, the storage 230 may store a command and/or an algorithm for processing and approving a payment, based on payment information input from the vehicle device 100.

Herein, the storage 230 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The customer DB 235 may be implemented within the storage 230. The customer DB 235 may be implemented independently of the storage 230.

The determination device 240 recognizes the vehicle information based on the received license plate image, when the license plate image of the vehicle captured from the service device 400 is received when a user's vehicle enters the parking lot. At this time, the determination device 240 calls the customer DB 235 and identifies customer information by comparing information registered in the customer DB 235 with the recognized vehicle information. The determination device 240 determines whether the corresponding vehicle is a vehicle capable of making an electronic payment, from the identified customer information. The determination device 240 transmits relevant information to the controller 210 and/or the information guide device 250, when the corresponding vehicle is a vehicle capable of making an electronic payment.

As such, the information guide device 250 identifies the corresponding parking lot information from the linked service device 400 linked depending on the determination result of the determination device 240, transmits the parking lot information to the vehicle device 100, and provides a guide.

Moreover, the determination device 240 determines whether there is a settlement charge, by identifying information about the parking fee of the corresponding vehicle from the service device 400, when a request for charge settlement information of a parking lot is received from the vehicle device 100. The determination device 240 transmits relevant information to the controller 210 and/or the information guide device 250, when it is determined that there is a settlement charge of the corresponding vehicle.

The information guide device 250 transmits charge settlement information of the parking lot to the vehicle device 100 depending on the determination result of the determination device 240 and provides a guide.

The information guide device 250 may include outstanding charge information before the vehicle enters the parking lot, in the charge settlement information of the parking lot and may provide the vehicle device 100 with a guide indicating the charge settlement information, when there is outstanding charge information about the corresponding vehicle before the vehicle enters the parking lot.

The information guide device 250 may identify the settlement charge of the corresponding vehicle from the service device 400, when there is a payment proceeding request from the vehicle device 100. At this time, the information guide device 250 transmits payment information about the settlement charge, which is identified from the service device 400, to the vehicle device 100 and provides a guide.

The settlement processor 260 can proceed with a payment using the payment method, a payment authorization number, and the like received from the vehicle device 100 and approve the payment, when there is a payment approval request for the settlement charge from the vehicle device 100.

The determination device 240 identifies a state where the vehicle goes out, through the service device 400, when the payment approval is completed by the settlement processor 260. The information guide device 250 transmits approval completion information to the vehicle device 100 and provides a guide, when the determination device 240 determines that the vehicle is leaving the parking lot.

The determination device 240 stands by until it is determined that a vehicle goes out, from the vehicle device 100 or until there is a request for charge settlement information about additional usage of the parking lot, when it is determined that the vehicle has not yet left the parking lot. Afterward, the determination device 240 identifies additional usage information of the corresponding vehicle from the service device 400, when a request for charge settlement information about the additional usage of a parking lot is received from the vehicle device 100. The determination device 240 transmits relevant information to the controller 210 and/or the information guide device 250, when it is determined that there is a fee to be paid additionally.

The determination device 240 transmits relevant information to the controller 210 and/or the information guide device 250, when it is determined that there is no fee to be paid additionally. Accordingly, the information guide device 250 transmits the previous payment approval completion information together with a message indicating that there is no information about a fee to be paid additionally, to the vehicle device 100 and provides a guide.

The vehicle device 100 and/or the cloud server 200 operating as described above may be implemented in the form of an independent hardware device including a memory and a processor for processing each operation and may be driven in the form included in other hardware devices such as a microprocessor or a general purpose computer system.

The operation flow of a payment processing system using a vehicle device according to an embodiment of the present disclosure will be described in more detail as follows.

Figure 4A:
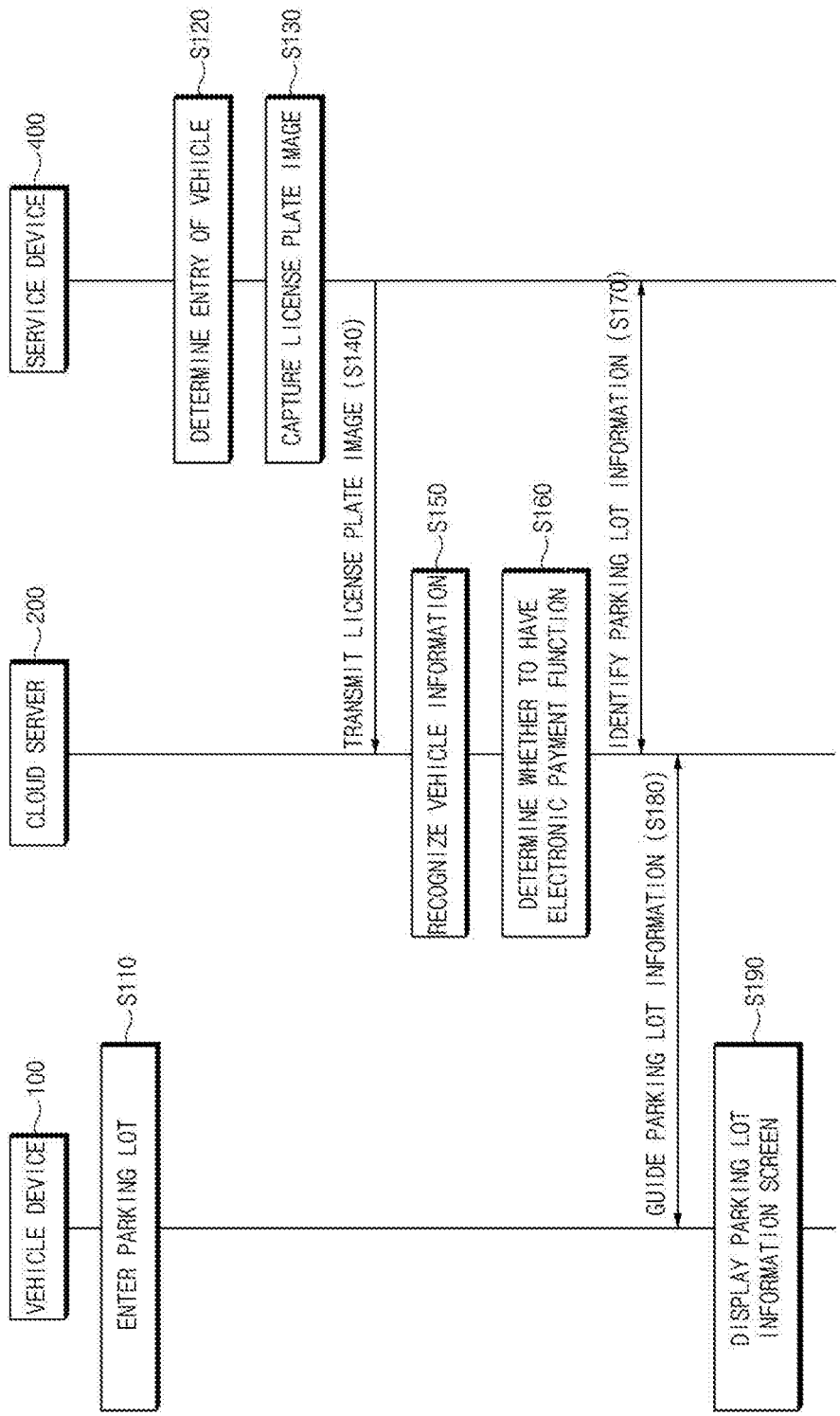
FIG. 4A is a diagram illustrating an operation flow for a payment processing method using a vehicle device, according to a first exemplary embodiment of the present disclosure.

FIG. 4A is a diagram illustrating an operation flow for a payment processing method using a vehicle device, according to a first exemplary embodiment of the present disclosure.

The first exemplary embodiment illustrates the operation flow of the payment processing system using the vehicle device based on a license plate image captured by the service device 400 when a vehicle enters a parking lot.

Referring to FIG. 4A, when a vehicle including the vehicle device 100 enters a parking lot in operation S110, the service device 400 installed in the parking lot determines the entry of vehicle in operation S120. In operation S130, the service device 400 captures a license plate image of the entering vehicle by using a camera when the vehicle enters the parking lot. At this time, in operation S140, the service device 400 transmits the license plate image of the corresponding vehicle to the linked cloud server 200.

In operation S150, the cloud server 200 recognizes the vehicle information based on the license plate image received in operation S140. At this time, in operation S160, the cloud server 200 identifies the customer information by comparing the information registered in the customer DB 235 with the recognized vehicle information and determines whether the corresponding vehicle is a vehicle capable of making an electronic payment.

In operation S170, the cloud server 200 identifies the parking lot information of the corresponding parking lot from the service device 400 and in operation S180, guides the parking lot information identified in operation S170 to the vehicle device 100, when the corresponding vehicle is a vehicle capable of making an electronic payment.

In operation S190, the vehicle device 100 displays the parking lot information screen based on the parking lot information received from the cloud server 200 in operation S180.

Figure 5:
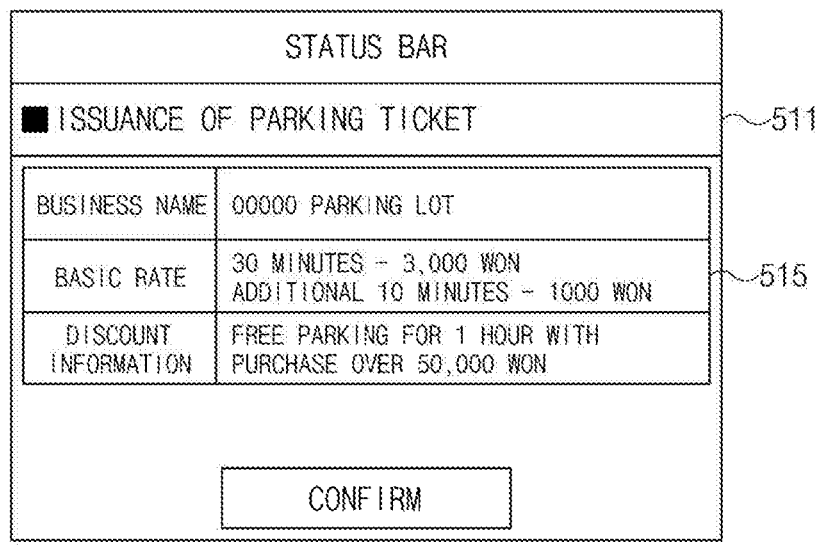
FIG. 5 is a view illustrating an embodiment of a parking lot information guide screen, according to a first or second exemplary embodiment of the present disclosure.

Here, the parking lot information screen refers to the embodiment of FIG. 5.

Referring to FIG. 5, the vehicle device 100 configures a parking lot information screen 511 based on the parking lot information 515 provided from the cloud server 200 and outputs the configured parking lot information screen 511 to a display, when a vehicle enters a parking lot.

Here, as illustrated in FIG. 5, the parking lot information 515 may include the parking lot name, rate information per basic usage time, rate information per additional usage time, discount information, and the like. In addition, in the embodiment of FIG. 5, it is described that the parking lot information screen 511 includes a part of information of a parking lot. However, an exemplary embodiment is not limited thereto. For example, the parking lot information screen 511 may further include other information associated with the parking lot such as a telephone number, a location, and the like of the parking lot.

Figure 4B:
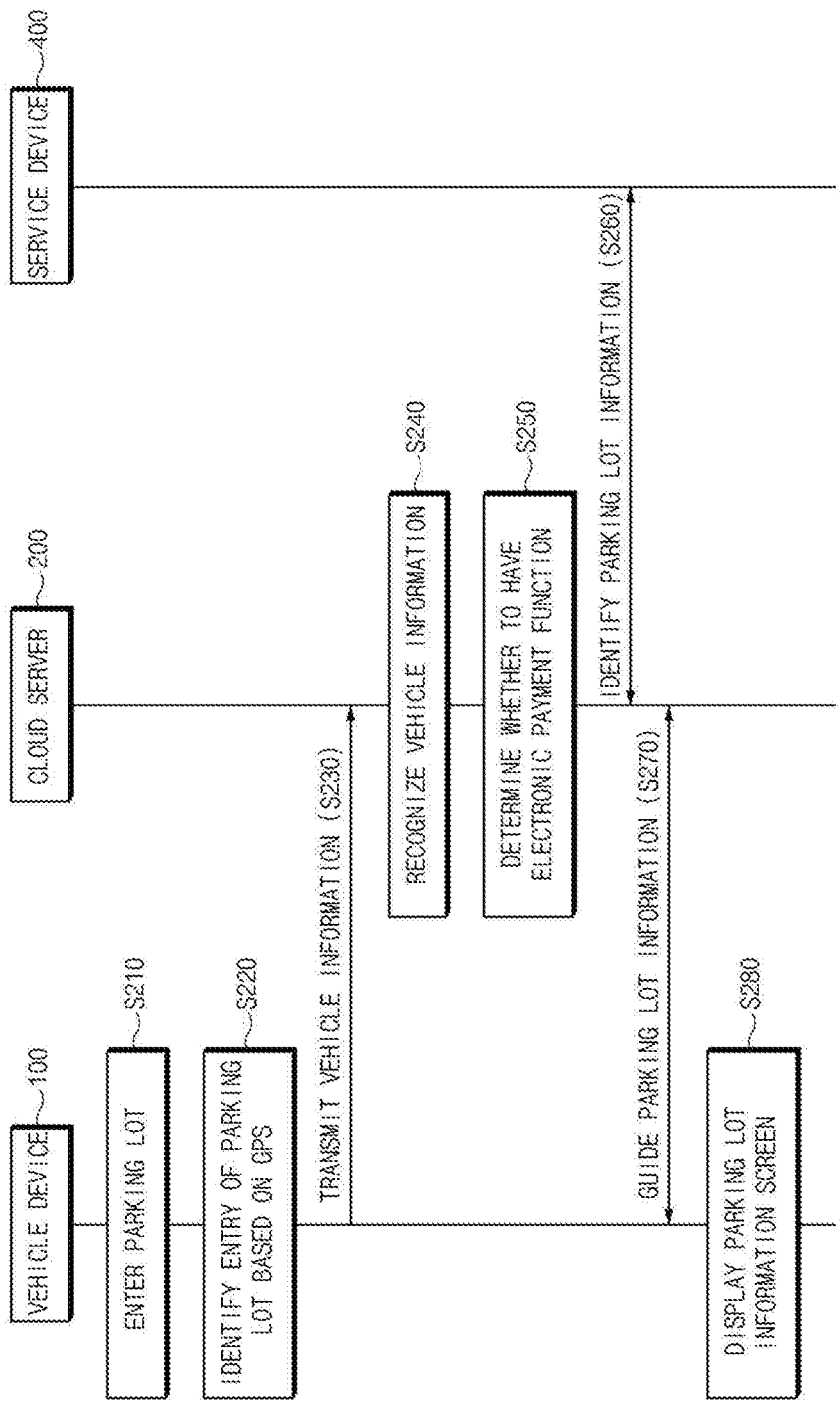
FIG. 4B is a diagram illustrating an operation flow for a payment processing method using a vehicle device, according to a second exemplary embodiment of the present disclosure.

FIG. 4B is a diagram illustrating an operation flow for a payment processing method using a vehicle device, according to a second exemplary embodiment of the present disclosure.

The second embodiment illustrates the operation flow of the payment processing system of the vehicle device 100 based on the vehicle information (e.g., VIN information) provided by the vehicle device 100 when a vehicle enters a parking lot. Here, the second embodiment may be implemented when a camera for recognizing a vehicle is not installed in a parking lot.

Referring to FIG. 4B, in operation S210, when a vehicle with the vehicle device 100 enters the parking lot, in operation S220, the vehicle device 100 identifies the entry of the parking lot based on GPS from the navigation 130.

When the entry of a parking lot is identified from the navigation 130, the vehicle device 100 transmits vehicle information, for example, VIN information, to the cloud server 200.

Afterward, in operation S240, the cloud server 200 recognizes the vehicle information from the information received in operation S230. In operation S250, the cloud server 200 identifies the customer information by comparing the information registered in the customer DB 235 with the recognized vehicle information and determines whether the corresponding vehicle is a vehicle capable of making an electronic payment.

In operation S260, the cloud server 200 identifies the parking lot information of the corresponding parking lot from the service device 400 and in operation S270, guides the parking lot information identified in operation S260 to the vehicle device 100, when the corresponding vehicle is a vehicle capable of making an electronic payment.

In operation S280, the vehicle device 100 displays the parking lot information screen based on the parking lot information received from the cloud server 200 in operation S270. Here, an embodiment of a parking lot information screen refers to the embodiment of FIG. 5.

Figure 6:
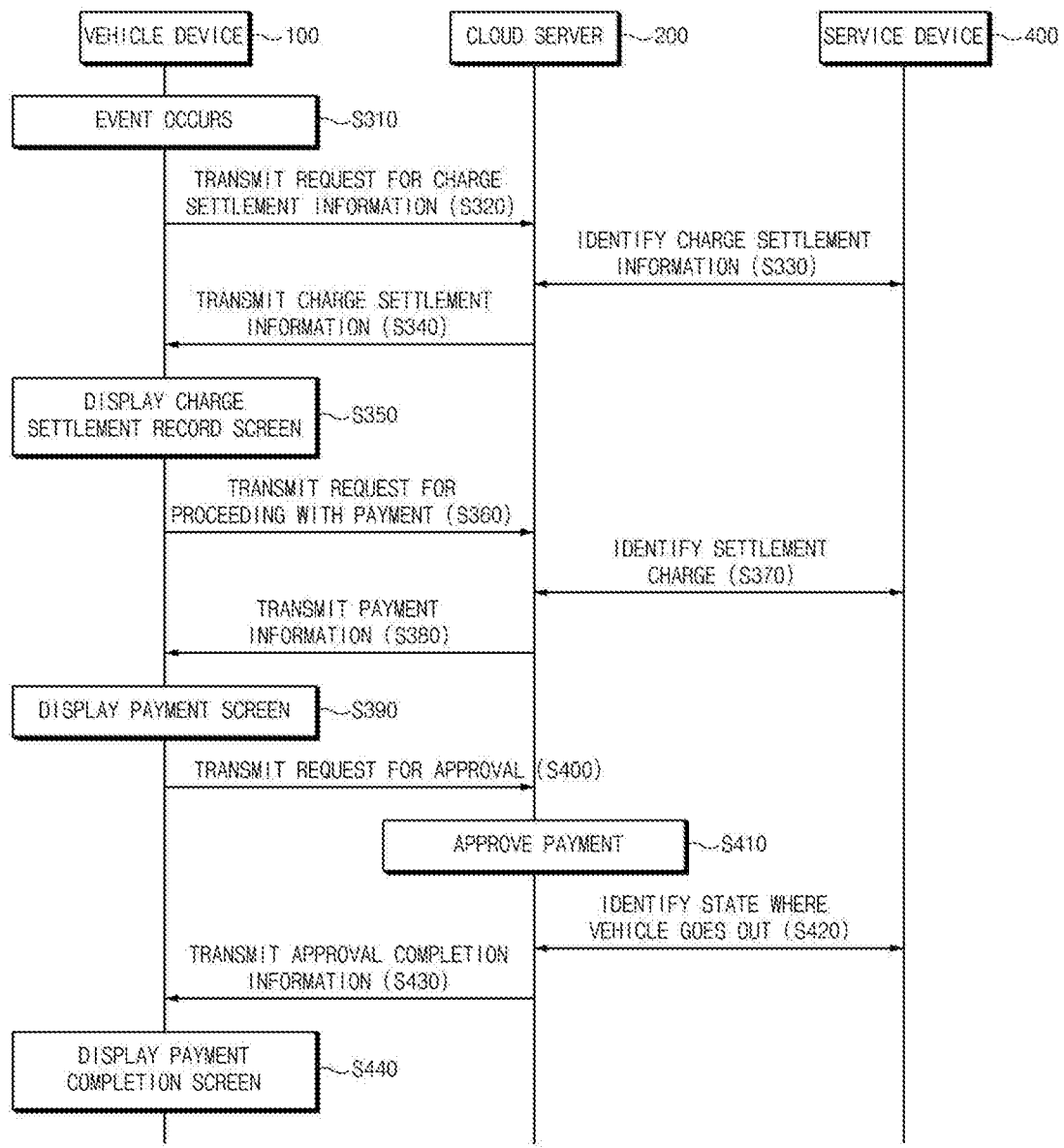
FIG. 6 is a diagram illustrating an operation flow for a payment processing method using a vehicle device, according to a third exemplary embodiment of the present disclosure.

FIG. 6 is a diagram illustrating an operation flow for a payment processing method using a vehicle device, according to a third exemplary embodiment of the present disclosure.

The third embodiment illustrates an operation flow of a payment processing system using a vehicle device when a charge settlement event occurs from a vehicle in a state where a parking fee is not paid.

Referring to FIG. 6, in operation S310, when the charge settlement event occurs, in operation S320, the vehicle device 100 transmits a request for charge settlement information from the cloud server 200. Here, the charge settlement event may include at least one or more of an event of switching the state of the accelerator or start of a vehicle from an off state to an on state, an event of switching a door state from an open state to a closed state, and a sleep mode release event.

In operation S330, the cloud server 200 identifies the charge settlement information of the corresponding vehicle from the service device 400 at the request of the vehicle device 100, and in operation S340, transmits the charge settlement information to the vehicle device 100 based on the information identified in operation S330.

Accordingly, in operation S350, the vehicle device 100 displays a payment guide screen based on the charge settlement information received in operation S340. Here, the payment guide screen refers to the embodiment of FIG. 7A.

Figure 7A:
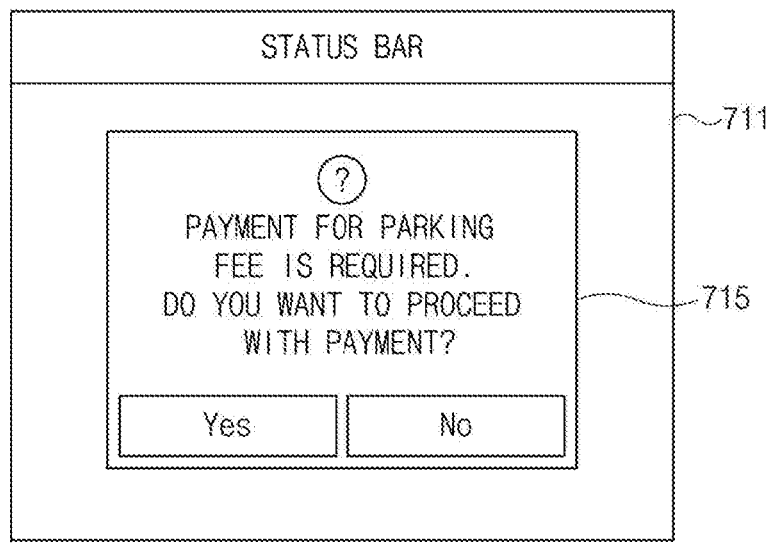
FIGS. 7A to 7D are views illustrating an embodiment of a guide screen, according to a third exemplary embodiment of the present disclosure.

As illustrated in FIG. 7A, the vehicle device 100 configures an outstanding guide screen 711 such that guide information 715 such as "Payment for parking fee is required. Do you want to proceed with a payment?" is included, and displays the outstanding guide screen 711 through a display, when it is determined that there is a settlement charge to be paid based on the information received from the cloud server 200. Accordingly, a user may select either "Yes" or "No" through the payment guide screen 711.

Operation S320 to operation S340 in FIG. 6 may be performed through a payment flag received from the cloud server 200 when a vehicle enters a parking lot.

Afterward, in operation S360, the vehicle device 100 transmits a request for proceeding with a payment of the parking fee to the cloud server 200, when a payment proceeding request is input through the payment guide screen in operation S350.

At this time, in operation S370, the cloud server 200 identifies information about a settlement charge of the corresponding vehicle, from the service device 400 at the request of the vehicle device 100, and in operation S380, transmits, to the vehicle device 100, payment information about the settlement charge, which is identified in operation S370.

In operation S390, the vehicle device 100 displays a payment screen based on the payment information received in operation S380. Here, the payment screen refers to the embodiment of FIG. 7B.

Figure 7B:
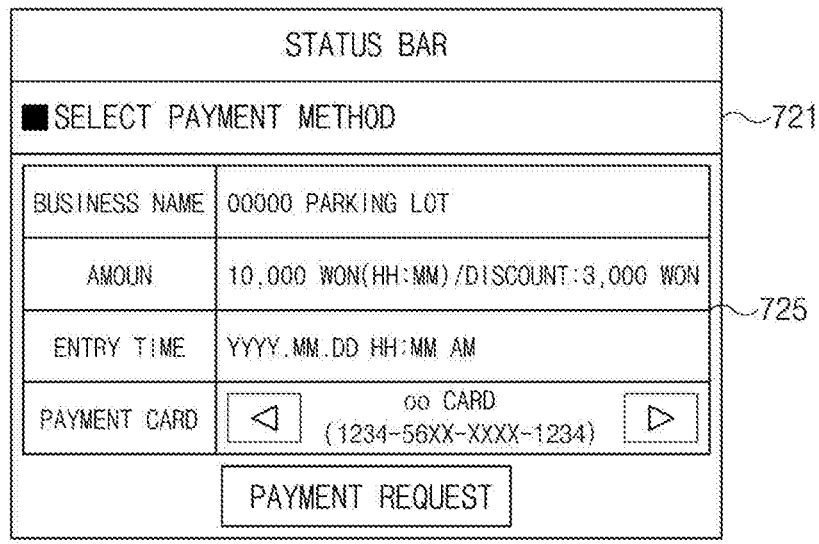

As illustrated in FIG. 7B, the vehicle device 100 may configure payment screen 721 by including payment information 725 received from the cloud server 200 (e.g., parking lot name, parking lot usage time and usage fee, discount amount, entry time, information about pre-registered payment card, and the like) and displays the payment screen 721 through a display.

Accordingly, the user may identify the payment information 725 displayed on the payment screen 721 and may make a request for a payment based on the previously registered payment card information or payment card information selected (or input) by the user.

At this time, the vehicle device 100 may additionally display a payment authentication screen for authenticating a user who makes a request for a payment. Here, the payment authentication screen refers to the embodiment of FIG. 7C.

Figure 7C:
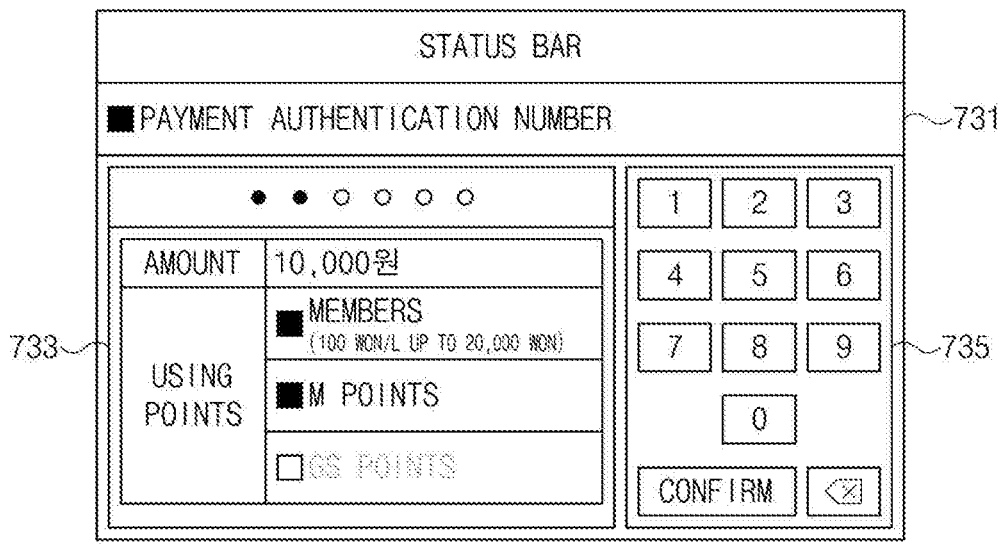

As illustrated in FIG. 7C, a payment authentication screen 731 may include a key input window 735 for entering point information together with authentication information for making a payment using a card of a user and an identification window 733 for identifying the authentication information and point information entered through the key input window 735.

In operation S400, the vehicle device 100 transmits a request for payment approval to the cloud server 200 based on the information entered through the payment screen 721 and the payment authentication screen 731, when payment authentication information, point information, and the like are entered through the payment authentication screen 731.

At this time, in operation S410, the cloud server 200 proceeds with the payment of the settlement charge based on the information received in operation S400 to approve the payment. The cloud server 200 may provide unapproved payment information to the vehicle device 100, when the approval is not completed in operation S410.

In operation S420, the cloud server 200 identifies a state where the corresponding vehicle is leaving the parking lot, from the service device 400, when the payment approval of the settlement charge is completed in operation S410.

In operation S430, the cloud server 200 transmits approval completion information to the vehicle device 100, when the corresponding vehicle is leaving the parking lot within a predetermined time after paying the settlement charge of the corresponding vehicle. Afterward, the cloud server 200 may remove the outstanding records of the corresponding vehicle and may terminate the relevant operation.

In operation S440, the vehicle device 100 displays a payment completion screen based on the information received in operation S430 upon leaving the parking lot. At this time, the vehicle device 100 deletes a payment flag of the corresponding parking lot received upon entering the parking lot.

Figure 7D:
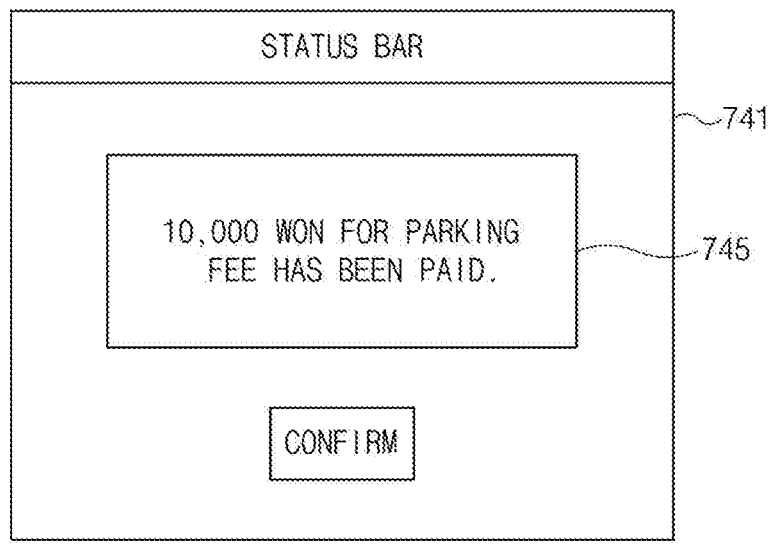

Here, the payment completion screen refers to the embodiment of FIG. 7D.

As illustrated in FIG. 7D, the vehicle device 100 configures a payment completion screen 741 such that guide information 745 such as "$10 for a parking fee has been paid" is included, and displays the payment completion screen 741 through a display, based on the information received from the cloud server 200. Accordingly, the user may identify that electronic payment processing for the usage fee of the corresponding parking lot has been completed, through the payment completion screen 741.

Figure 8:
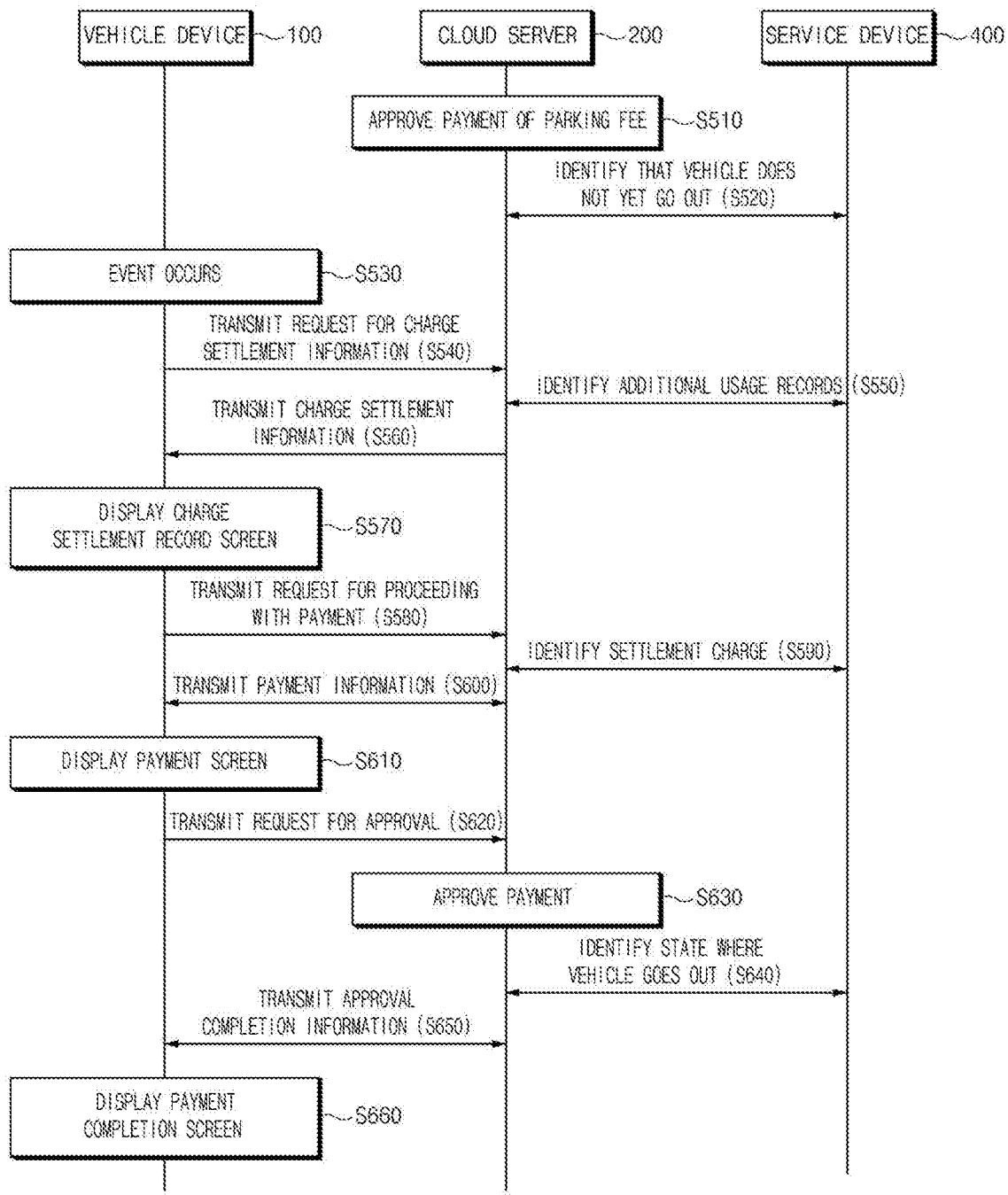
FIG. 8 is a diagram illustrating an operation flow for a payment processing method using a vehicle device, according to a fourth exemplary embodiment of the present disclosure.

FIG. 8 is a diagram illustrating an operation flow for a payment processing method using a vehicle device, according to a fourth exemplary embodiment of the present disclosure.

The fourth embodiment illustrates an operation flow of a payment processing system using a vehicle device when an event that a vehicle is leaving a parking lot occurs again after a parking fee is paid.

Referring to FIG. 8, after the payment approval process of the settlement charge is completed through operation S310 to operation S410 of FIG. 6 in operation S510, the cloud server 200 may identify a state where the corresponding vehicle is leaving the parking lot, from the service device 400. At this time, in operation S520, when it is identified that the corresponding vehicle has not yet left the parking lot within a specified time after the corresponding vehicle pay the parking fee, the cloud server 200 waits for payment completion processing for the corresponding vehicle.

Afterward, in operation S530, when the charge settlement event occurs again from the corresponding vehicle to leave the parking lot, in operation S540, the vehicle device 100 transmits a request for charge settlement information to the cloud server 200 again.

At this time, in operation S550, the cloud server 200 identifies parking lot additional usage records of the corresponding vehicle from the service device 400 at the request of the vehicle device 100, and in operation S560, the cloud server 200 transmits the charge settlement information about the parking lot additional usage records of the corresponding vehicle identified in operation S550, to the vehicle device 100.

Accordingly, in operation S570, the vehicle device 100 displays a payment guide screen based on the charge settlement information received in operation S560. Here, the payment guide screen refers to the embodiment of FIG. 7A.

Afterward, in operation S580, the vehicle device 100 transmits a request for proceeding with a payment of the settlement charge for parking lot additional usage, to the cloud server 200 when a payment proceeding request is input through the payment guide screen in operation S570.

At this time, in operation S590, the cloud server 200 identifies information about a settlement charge of the corresponding vehicle, from the service device 400 at the request of the vehicle device 100, and in operation S600, transmits, to the vehicle device 100, additional payment information about the settlement charge, which is identified in operation S590.

In operation S610, the vehicle device 100 displays an additional payment screen based on the additional payment information received in operation S600. The user may select payment card information through the additional payment screen. Furthermore, the vehicle device 100 may additionally display a payment authentication screen for authenticating a user who makes a request for a payment. At this time, the user may enter payment authentication information, point information, and the like through the payment authentication screen.

In operation S620, the vehicle device 100 transmits a request for payment approval to the cloud server 200 based on the information entered from the user.

At this time, in operation S630, the cloud server 200 proceeds with the payment of the settlement charge for additional usage of a parking lot based on the information received in operation S620 to approve the payment. The cloud server 200 may provide unapproved payment information to the vehicle device 100, when the approval is not completed in operation S630.

In operation S640, the cloud server 200 identifies a state where the corresponding vehicle is leaving the parking lot, from the service device 400, when the additional payment approval of the settlement charge is completed in operation S630.

In operation S650, the cloud server 200 transmits approval completion information to the vehicle device 100, when the corresponding vehicle is leaving the parking lot within a predetermined time after paying the settlement charge.

As such, in operation S660, the vehicle device 100 displays a payment completion screen based on the information received in operation S650 upon leaving the parking lot. At this time, the vehicle device 100 deletes a payment flag of the corresponding parking lot received upon entering the parking lot.

Figure 9A:
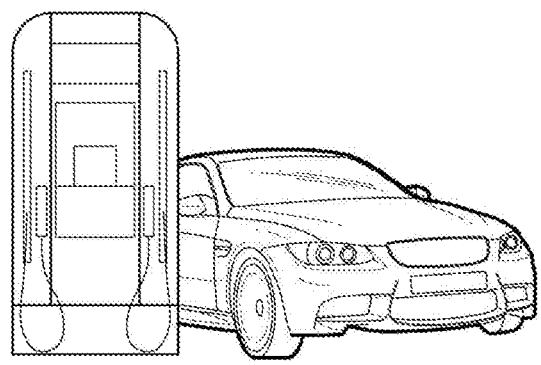
FIGS. 9A and 9B are views illustrating another exemplary embodiment of the present disclosure.
Figure 9B:
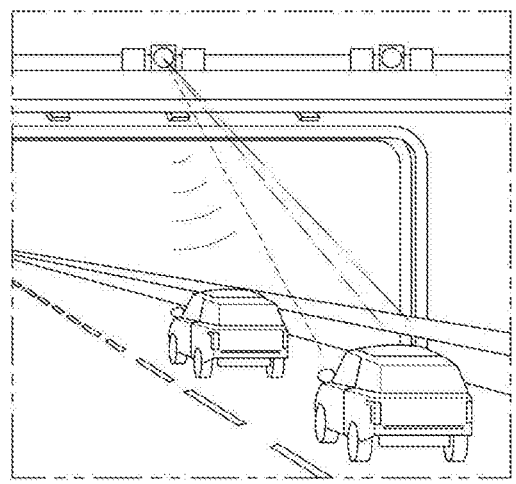

An embodiment is exemplified as an electronic payment processing is performed on a parking fee of a parking lot. However, the embodiment may be used when a gasoline charge is paid electronically at a gas station as illustrated in FIG. 9A, or when the toll is paid electronically on a toll road such as expressway as illustrated in FIG. 9B.

Figure 10:
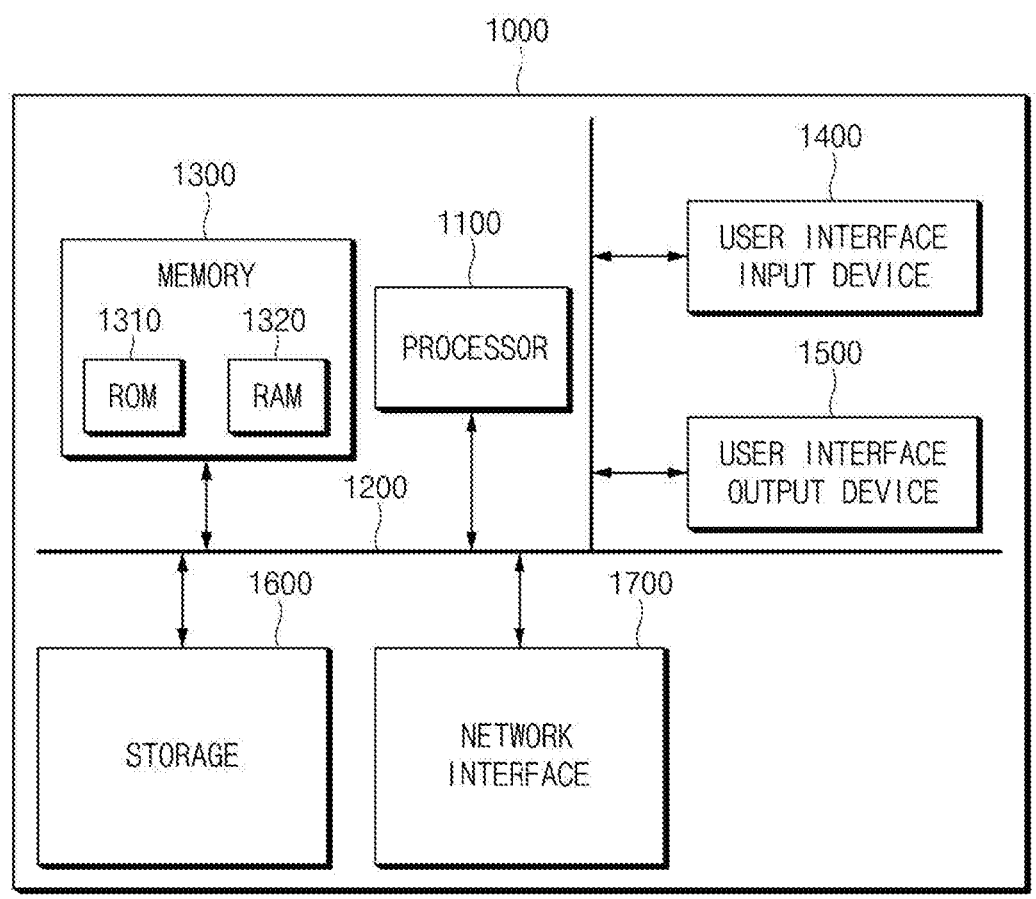
FIG. 10 is a diagram illustrating a computing system performing a method, according to an exemplary embodiment of the present disclosure.

FIG. 10 is a diagram illustrating a computing system performing a method, according to an exemplary embodiment of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, it is possible to recognize vehicle information in a server linked to a service device of the parking lot when a vehicle enters a parking lot to automatically provide a guide indicating parking lot information to a driver of the vehicle, and then to automatically identify the outstanding records between the vehicle device and the server when an event that the vehicle is leaving the parking lot occurs to pay a parking fee, thereby easily and quickly paying the parking fee.

In addition, it is also possible to easily and quickly process payment for an additional rate, by identifying a state in which the vehicle goes out after settling the parking fee, and then determining whether an event that the vehicle goes out occurs again.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle device comprising:
    a communication device configured to transmit or receive a signal to or from a cloud server operating in conjunction with a service device of a parking lot upon entering the parking lot; and
    a controller configured to:
        output parking lot information received from the cloud server upon entering the parking lot, and
        identify charge settlement information of the parking lot from the cloud server to pay a settlement charge, when a predetermined charge settlement event occurs,
    wherein the charge settlement information includes outstanding charge information about a vehicle before entry of the parking lot.

2. The vehicle device of claim 1, wherein the parking lot information includes at least one or more of a parking lot name, parking time, basic rate information and additional rate information, or discount information.

3. The vehicle device of claim 1, wherein the charge settlement event includes at least one or more of an event of switching a state of an accelerator or start of a vehicle from an off state to an on state, an event of switching a door state from an open state to a closed state, or a sleep mode release event.

4. The vehicle device of claim 1, wherein the controller is configured to:
    identify locations of a vehicle and the parking lot, respectively, from navigation to determine whether the vehicle enters the parking lot.

5. The vehicle device of claim 4, wherein the controller is configured to:
    when it is determined that the vehicle enters the parking lot, transmit vehicle information for identifying the vehicle to the cloud server.

6. The vehicle device of claim 2, wherein the parking lot information further includes a payment flag for paying the settlement charge.

7. The vehicle device of claim 1, wherein the controller is configured to, before leaving the parking lot, identify and pay an additional settlement charge when charge settlement information about additional usage of the parking lot is received from the cloud server.

8. A payment processing system using a vehicle device of a vehicle, the system comprising:
    the vehicle device configured to pay a settlement charge of a parking lot;
    a service device of the parking lot; and
    a cloud server configured to:
        recognize information of the vehicle entering the parking lot,
        when a predetermined charge settlement event occurs from the vehicle, guide the vehicle device with charge settlement information of the parking lot generated from the service device, and
        process the settlement charge based on payment information received from the vehicle device,
    wherein the cloud server is configured to, when it is determined that the vehicle is capable of making an electronic payment based on the information of the vehicle recognized when the vehicle enters the parking lot, identify parking lot information from the service device to guide the parking lot information to the vehicle device.

9. The system of claim 8, wherein the service device captures a license plate image of the vehicle entering the parking lot by using a camera to transmit the license plate image to the cloud server, and
    wherein the cloud server is configured to recognize the information of the vehicle based on the license plate image of the vehicle received from the service device.

10. The system of claim 8, wherein the cloud server is configured to, when the vehicle enters the parking lot, recognize the information of the vehicle based on identification information of the vehicle received from the vehicle device.

11. The system of claim 8, wherein the cloud server is configured to, when accessing the service device or when changing the parking lot information, update the parking lot information from the service device.

12. The system of claim 8, wherein the charge settlement event includes at least one or more of an event of switching a state of an accelerator or start of the vehicle from an off state to an on state, an event of switching a door state from an open state to a closed state, or a sleep mode release event.

13. The system of claim 8, wherein the cloud server is configured to, when there is an outstanding charge before the vehicle enters the parking lot based on the information of the vehicle recognized when the vehicle enters the parking lot, include outstanding charge information in the charge settlement information to guide the outstanding charge information to the vehicle device.

14. The system of claim 8, wherein the cloud server is configured to:
    recognize payment card information by comparing information registered in a customer database (DB) in advance with the recognized information of the vehicle; and
    process the settlement charge, based on the recognized payment card information.

15. The system of claim 8, wherein the cloud server is configured to process a payment of the settlement charge of the vehicle based on payment card information received from the vehicle device.

16. The system of claim 8, wherein the cloud server is configured to, when a payment of the settlement charge is completed and it is determined that the vehicle leaves the parking lot, provide payment completion information to the vehicle device.

17. The system of claim 8, wherein the cloud server is configured to, when the charge settlement event occurs in a state where a payment of the settlement charge of the vehicle is completed and the vehicle has not yet left the parking lot, identify charge settlement information about additional usage of the parking lot from the service device to guide the charge settlement information to the vehicle device.

18. A payment processing method of a payment processing system including a vehicle device, a service device, and a cloud server, the method comprising:

when a vehicle enters a parking lot, recognizing, by the cloud server, information of the vehicle;

when a predetermined charge settlement event occurs from the vehicle, identifying, by the cloud server, charge settlement information of the parking lot from the service device linked through a gateway to guide the charge settlement information to the vehicle device, wherein the charge settlement information includes outstanding charge information about a vehicle before entry of the parking lot, in response to determination that there is outstanding charge information about the vehicle before entry of the parking lot;

transmitting, by the vehicle device, payment information about a settlement charge to the cloud server based on the charge settlement information; and processing, by the cloud server, the settlement charge based on the payment information received from the vehicle device.

19. The method of claim 18, further comprising:

when a payment of the settlement charge is completed, identifying, by the cloud server, whether the vehicle is leaving the parking lot, through the service device; and when the vehicle is leaving the parking lot, providing payment completion information to the vehicle device.

20. The method of claim 19, further comprising, when the charge settlement event occurs from the vehicle in a state where the vehicle has not yet left the parking lot, identifying, by the cloud server, charge settlement information about additional usage of the parking lot from the service device to guide the charge settlement information to the vehicle device.

21. The method of claim 20, further comprising:

transmitting, by the vehicle device, payment information about the settlement charge to the cloud server based on charge settlement information about the additional usage of the parking lot; and processing, by the cloud server, the settlement charge about the additional usage of the parking lot based on the payment information received from the vehicle device.

\* \* \* \* \*